US012726678B2

(12) United States Patent
Wang et al.

(10) Patent No.: US 12,726,678 B2
(45) Date of Patent: Sep. 1, 2026

(54) MODEL-BASED DATA PROCESSING METHOD AND APPARATUS

(71) Applicant: TENCENT TECHNOLOGY (SHENZHEN) COMPANY LIMITED, Shenzhen (CN)

(72) Inventors: Hanzi Wang, Shenzhen (CN); Guangge Wang, Shenzhen (CN); Zhongang Qi, Shenzhen (CN); Ying Shan, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 393 days.

(21) Appl. No.: 18/199,528

(22) Filed: May 19, 2023

(65) Prior Publication Data

US 2023/0353828 A1 Nov. 2, 2023

Related U.S. Application Data

(63) Continuation of application No. PCT/CN2022/110247, filed on Aug. 4, 2022.

(30) Foreign Application Priority Data

Sep. 16, 2021 (CN) ........................ 202111087467.0

(51) Int. Cl.
*H04N 21/4627* (2011.01)
*G06V 10/74* (2022.01)
(Continued)

(52) U.S. Cl.
CPC ....... *H04N 21/4627* (2013.01); *G06V 10/761* (2022.01); *G06V 10/774* (2022.01); *G06V 20/44* (2022.01); *H04N 21/4826* (2013.01)

(58) Field of Classification Search
CPC ........... G06F 16/71; G06F 16/73; G06N 3/04; G06N 3/08; G06V 10/761; G06V 10/774;
(Continued)

(56) References Cited

U.S. PATENT DOCUMENTS

| | | | | |
|---|---|---|---|---|
| 11,589,116 | B1 * | 2/2023 | Omar | G06V 20/44 |
| 12,112,538 | B2 * | 10/2024 | Arnab | G06N 3/0464 |
| 2021/0264261 | A1 | 8/2021 | Staudinger et al. | |
| 2021/0374412 | A1 * | 12/2021 | Cerri | G06T 7/90 |

FOREIGN PATENT DOCUMENTS

| | | | |
|---|---|---|---|
| CN | 108921087 | A | 11/2018 |
| CN | 110532911 | A | 12/2019 |

(Continued)

OTHER PUBLICATIONS

Office Action issued in CN Application No. 202111087467.0.

(Continued)

*Primary Examiner* — Omar S Parra
(74) *Attorney, Agent, or Firm* — Sughrue Mion, PLLC

(57) ABSTRACT

A model-based data processing method and apparatus that can extract a first training sample set to obtain a second training sample set and a query video, the first training sample set including different types of video samples; process the second training sample set through an embedded layer network in an action recognition model to obtain a first frame feature sequence; process the query video through the embedded layer network to obtain a second frame feature sequence; process the first frame feature sequence through a time sequence relation network in the action recognition model to obtain a first time sequence relation descriptor; process the second frame feature sequence through the time sequence relation network to obtain a second time sequence relation descriptor; and adjust a model parameter of the (Continued)

action recognition model according to the first time sequence relation descriptor and the second time sequence relation descriptor.

20 Claims, 9 Drawing Sheets

(51) Int. Cl.
*G06V 10/774* (2022.01)
*G06V 20/40* (2022.01)
*H04N 21/482* (2011.01)

(58) Field of Classification Search
CPC ........ G06V 10/82; G06V 20/41; G06V 20/44; G06V 20/46; H04N 21/23418; H04N 21/4627; H04N 21/4826
See application file for complete search history.

(56) References Cited

FOREIGN PATENT DOCUMENTS

| | | | |
|---|---|---|---|
| CN | 111831852 | A | 10/2020 |
| CN | 112084954 | A | 12/2020 |
| CN | 113111842 | A | 7/2021 |
| CN | 114282047 | A | 4/2022 |

OTHER PUBLICATIONS

Rami Ben-Ari, et al., "TALEN: Temporal Aware Embedding Network for Few-Shot Action Recognition", 2021 IEEE/CVF Conference on Computer Vision and Pattern Recognition Workshops, Sep. 1, 2021, p. 2780-2788.
International Search Report for PCT/CN2022/110247 dated Oct. 21, 2022 [PCT/ISA/210].

* cited by examiner

MODEL-BASED DATA PROCESSING METHOD AND APPARATUS

CROSS REFERENCE TO RELATED APPLICATION

The disclosure is a continuation of PCT/CN2022/110247 filed on Aug. 4, 2022 and claims priority to Chinese Patent Application No, 202111087467.0 filed on Sep. 16, 2021, the contents of which are incorporated by reference herein in its entirety.

FIELD

Embodiments of the disclosure relate to an image processing technology in the field of videos, and in particular, to a model-based data processing method and apparatus, an electronic device, a computer-readable storage medium, and a computer program product.

BACKGROUND

Various video type recognition based on deep learning has always been an important tool for massive data analysis in various application scenes. For example, in application scenes such as image and natural language processing, classification and recognition of a large amount of data are realized so as to quickly and accurately obtain relevant classification prediction results and accelerate functional realization of the application scenes. However, in the process of classification and recognition, it is usually necessary to realize the classification and recognition of a large amount of data, so as to quickly and accurately obtain relevant action recognition results. However, in actual applications, it is often difficult to collect enough marker samples for the traditional machine learning to extract motion pattern features for actions of a character in a video, and therefore, a model overfit phenomenon would easily appear, which affects the accuracy of an action recognition model.

SUMMARY

Therefore, embodiments of the disclosure provides a model-based data processing method and apparatus, an electronic device, a computer-readable storage medium, and a computer program product that may enhance the generalization of the action recognition model and improve the accuracy of the action recognition model.

Technical solutions in the embodiments of the disclosure are implemented as follows:

An embodiment of the disclosure provides a model-based data processing method, including extracting a first training sample set, to obtain a second training sample set and a query video, the first training sample set comprising different types of video samples. The method may further include processing the second training sample set through an embedded layer network in an action recognition model to obtain a first frame feature sequence, the first frame feature sequence comprising a first plurality of frames. The method may further include processing the query video through the embedded layer network to obtain a second frame feature sequence, the second frame feature sequence comprising a second plurality of frames. The method may further include processing the first frame feature sequence through a time sequence relation network in the action recognition model to obtain a first time sequence relation descriptor. The method may further include processing the second frame feature sequence through the time sequence relation network to obtain a second time sequence relation descriptor. The method may further include adjusting a model parameter of the action recognition model according to the first time sequence relation descriptor and the second time sequence relation descriptor, the adjusted action recognition model being configured to recognize an action in a video to be recognized.

According to other aspects of one or more embodiments, there is also provided an apparatus and non-transitory computer readable medium consistent with the method.

DETAILED DESCRIPTION

Figure 1:
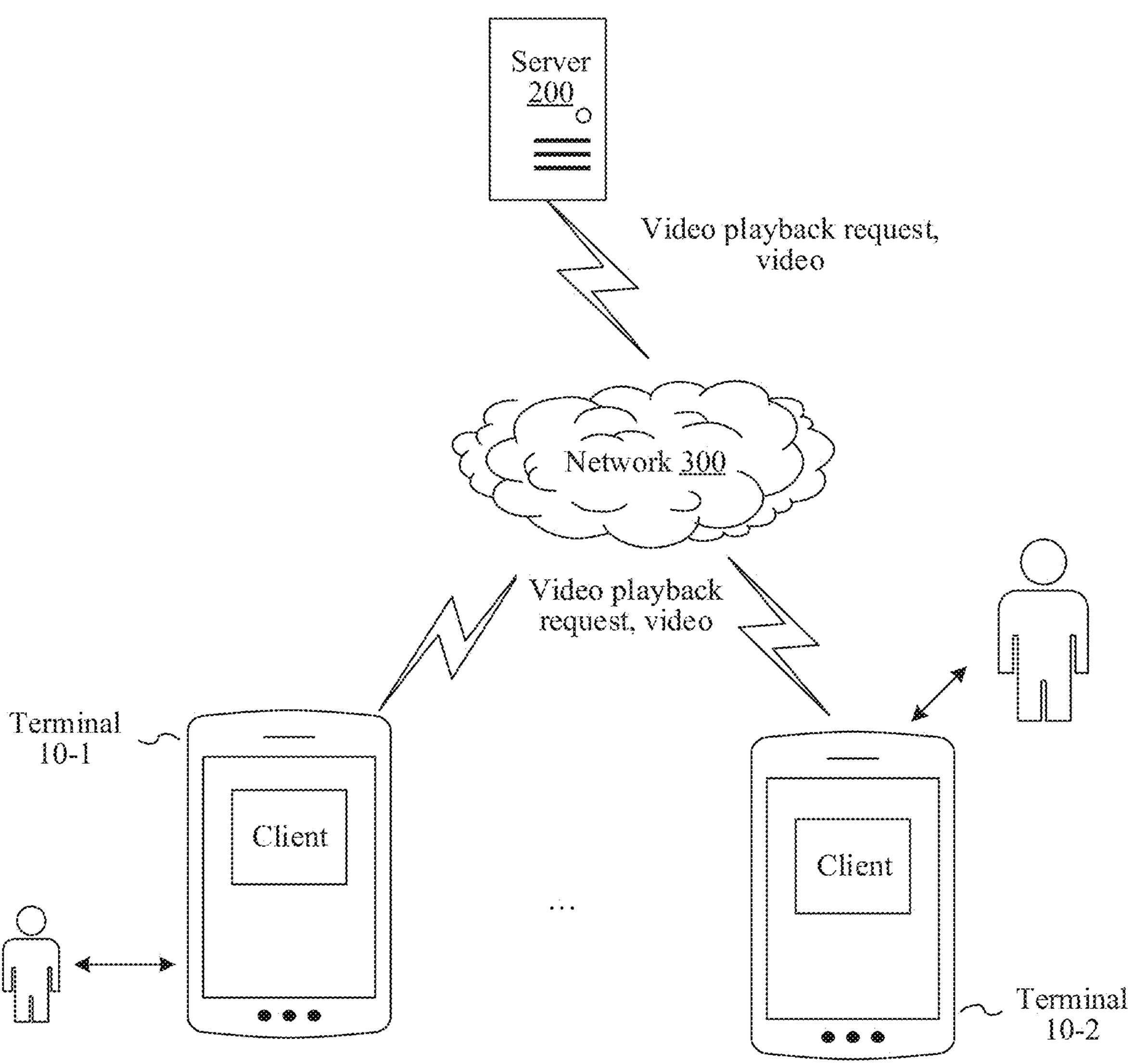
FIG. 1 is a schematic diagram of an exemplary application scene of a model-based data processing method according some embodiments.

To make the objectives, technical solutions, and advantages of the disclosure clearer, the following describes the disclosure in further detail with reference to the accompanying drawings. The described embodiments are not to be considered as a limitation to the disclosure. All other embodiments obtained by a person of ordinary skill in the art without creative efforts shall fall within the protection scope of the disclosure.

In the following description, the term "some embodiments" is involved and describes subsets of all possible embodiments, but it may be understood that "some embodiments" may be the same subset or different subsets of all the possible embodiments, and may be combined with each other without conflict.

Before the embodiments of the disclosure are further described in detail, a description is made on nouns and terms involved in the embodiments of the disclosure, and the nouns and terms involved in the embodiments of the disclosure are applicable to the following explanations.

1) In response, is used for representing a condition or state to which the executed operations depend; when meeting the depended condition or state, the executed one or more operations may be in real time and may also have a set delay. Without special explanations, the executed multiple operations are not limited by the order of executions.
2) A video to be recognized, relates to various forms of video information that may be obtained in the Internet, such as video files and multi-media information presented in a client or smart device.

3) A client, is a carrier for implementing a special function in the terminal, for example, a mobile client (APP) is a carrier of a specific function in a mobile terminal, for example, the client for implementing an online live broadcasting (video pushing) function or an online video playback function.
4) An artificial neural network, is called a Neural Network (NN) for short. In the field of machine learning and cognitive science, the artificial neural network is a mathematical model or a computational model that mimics the structure and function of a biological neural network for estimating or approximating functions.
5) Down sampling means performing sampling on a sample value sequence at intervals. In the sample value sequence, sampling is conducted every several sample values. In this way, an obtained new sequence is a down sampling result of an original sequence. For example: for an image I with a size of M*X, s-time down sampling is conducted thereon, and an image of size (M/s)*(X/s) may be obtained, where s is the common divisor of M and X.
6) Meta-learning is also referred to as learning to learn, which refers to a process of learning how to learn. Traditional machine learning is a mathematical model for prediction that learns from the beginning, and is far from a process of learning and accumulating historical experiences (also known as meta-knowledge) to guide new learning tasks by human. Meta-learning is a learning training process of learning different machine learning tasks, and learning how to faster and better train a model.
7) Few-shot learning is used for rapidly and efficiently training a prediction model under the condition of a small amount (lower than a specified quantity) of marked samples. Few-shot learning is an application of meta-learning in the field of monitoring learning. In the embodiments of the disclosure, the training of the action recognition model is a process of few-shot learning.
8) Training setting information (N-Way K-Shot) of few-shot learning in the field of classification refers to during the training stage, extracting N types from the training set, each type corresponding to K samples, N*K samples in total. The N*K samples constitute a meta task. The meta task is referred to as a support set of the model. In addition, then a patch of samples are extracted from the remaining data sets except the support set to serve as the prediction objects of the model (the query set).
9) A meta-learning model training and test unit (task) consists of the support set and a query set. For example, when N-Way K-Shot is 5-Way 5-Shot, 5 types are randomly selected from the data set, then 5 samples of each type are randomly selected to form the support set, and a certain quantity (such as 15) of samples of the same type are selected from the same type to form the query set. Hence, the support set composed of 5*5 samples and a query machine composed of 15 samples constitute a meta-learning model training and testing unit.
10) A model parameter is a parameter that uses universal variable to establish a relation between a function and a variable. In the artificial neural network, the model parameter is generally a real number matrix.
11) Cloud computing is a computing mode that distributes computing tasks on a resource pool of a large number of computing mechanisms so that various application systems may obtain computing power, storage space, and information services according to needs. The network that provides resources is called "cloud". The resources in the "cloud" may be extended infinitely in the eyes of the user, and may be obtained at any time, used on demand, expanded at any time, and paid according to use. As a cloud computing infrastructure provider, it would establish a cloud computing resource pool platform (cloud platform for short), commonly known as Infrastructure as a Service (IaaS). In addition, multiple types of virtual resources are deployed in the resource pool for external customers to select and use. The cloud computing resource pool includes: a computer device (which may be a virtualized machine, including an operating system), a storage device, and a network device.

The embodiments of the disclosure have the following beneficial effects: the embodiments of the disclosure relate to firstly extracting the second training sample set and the query video from the first training sample set including different types of video samples as training data, then obtaining the first time sequence relation descriptor through the first frame feature sequence of the second training sample set, obtaining the second time sequence relation descriptor through the second frame feature sequence of the query video, and finally, adjusting the model parameters of the action recognition model according to the first time sequence descriptor and the second time sequence descriptor. Since the first time sequence relation descriptor and the second time sequence relation descriptor used in the adjustment process represent the time sequence relation between the video frame sequences, and since the action occurring in the video corresponds to a certain time sequence, by mining the time sequence relation between the video frame sequences and adjusting the parameters of the action recognition model through the time sequence relation descriptor, the adjusted action recognition model may accurately recognize the actions in the video, enhancing the generalization of the model and improving the accuracy of the action recognition model.

FIG. 1 is a schematic diagram of an exemplary application scene of a model-based data processing method according to some embodiments. Referring to FIG. 1, the terminal (exemplarily showing terminals 10-1 and 10-2) is provided with a client capable of performing different functions, where the client on the terminal sends a video playback request to server 200 (called an electronic device for model-based data processing) through network 300 using different service processes, to obtain different videos from the corresponding server 200 for browsing; the terminal is connected to the server 200 through the network 300; the network 300 may be a WAN or LAN, or a combination of the two and use wireless links to achieve data transmission. Moreover, the video types obtained from corresponding servers 200 through the network 300 are different, for example: the terminal may either obtain a video from the corresponding server 200 through network 300 (that is, the video carries video information or a corresponding video link) or obtain the corresponding video including only text or images from the corresponding server 200 through network 300. Different types of videos may be stored in the server 200. In some embodiments, compilation environments of different types of videos are no longer distinguished. For videos uploaded by a large number of users (larger than the specified quantity) (including but not limited to short videos (with the video duration shorter than the specified duration) and long videos (with the video duration longer than or equal to the specified duration)), similar videos should be determined and compliance of the copyright information of similar videos should be recognized. In this process, the action recognition model may be used for determining whether the videos pushed to the user's client are copyright compliant videos. In addition, the action in the video may also be recognized through the action recognition model, so as to form an action preview on-screen comment or the action preview in progress bar information.

Taking the short video as an example, the action recognition model provided in the disclosure may be applied to short video playback. In short video playback, different short videos from different sources are usually processed, and videos to be recommended corresponding to corresponding users are finally presented on the User Interface (UI). If the recommended videos are pirated videos and other videos with copyright that is not compliant, the user experience will be directly affected. The background database of video playback will receive a large number of videos from different sources every day. The different videos obtained from the video recommendation to target users may also be called by other application programs (for example, the recommendation result of the short video recommendation process is migrated into the long video recommendation process or news recommendation process). Of course, the action recognition model matching the corresponding target user may also be migrated to different video recommendation processes (for example, a web video recommendation process, a small program video recommendation process, or a long video client video recommendation process).

The model-based data processing method provided in some embodiments of the disclosure is implemented based on Artificial Intelligence (AI). AI involves a theory, a method, a technology, and an application system that use a digital computer or a machine controlled by the digital computer to simulate, extend, and expand human intelligence, perceive an environment, obtain knowledge, and use knowledge to obtain an optimal result. In other words, AI is a comprehensive technology in computer science and is used for understanding the essence of intelligence and producing a new intelligent machine that may react in a manner similar to human intelligence. Hence, AI is to study the design principles and implementation methods of various intelligent machines, to enable the machines to have the functions of perception, reasoning, and decision-making.

The AI technology is a comprehensive discipline, and relates to a wide range of fields including both hardware-level technologies and software-level technologies. The basic AI technologies may include technologies such as a sensor, a dedicated AI chip, cloud computing, distributed storage, a big data processing technology, an operating/interaction system, and electromechanical integration. AI software technologies may include several directions such as a computer vision (CV) technology, a speech processing technology, a natural language processing technology, and machine learning (ML)/deep learning.

In some embodiments, the involved AI software technology includes indirections of machine learning. ML is a multidisciplinary subject, involving probability theory, statistics, approximation theory, convex analysis, and algorithm complexity theory, and is used for studying how a computer simulates or implements a human learning behavior to obtain new knowledge or skills, and reorganize an existing knowledge structure, so as to keep improving its performance. ML is the core of AI, is a basic way to make the computer intelligent, and is applied to various fields of AI. ML usually includes techniques such as Deep Learning, which includes artificial neural networks, such as Convolutional Neural Network (CNN), Recurrent Neural Network (RNN), and Deep Neural Network (DNN).

Figure 2:
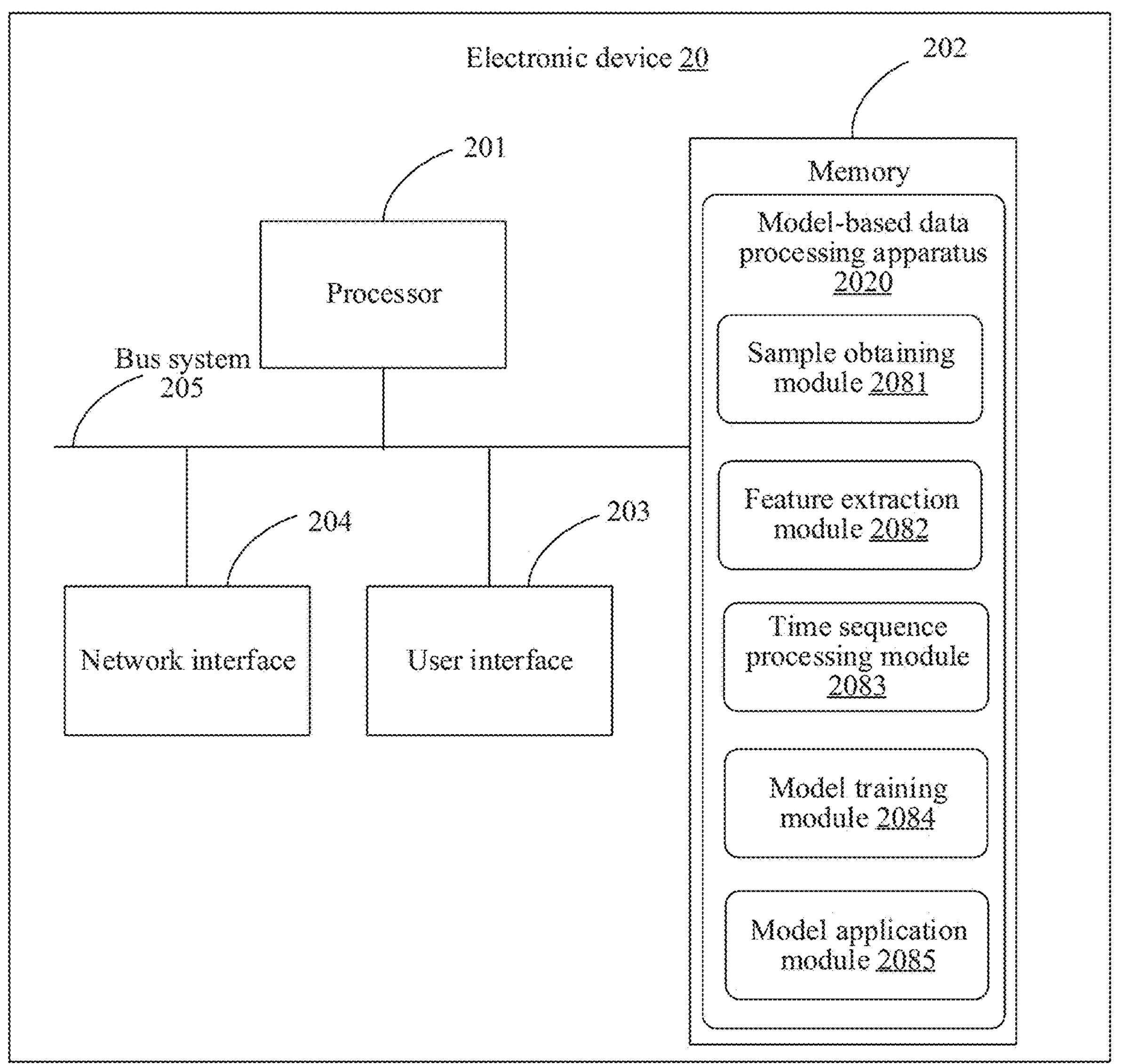
FIG. 2 is a schematic structural diagram of a composition of an electronic device according to some embodiments.

The following is a detailed description of the structure of the electronic device in some embodiments of the disclosure. The electronic device may be implemented in various forms, may be a dedicated terminal with a video processing function, for example, a gateway, or may also be a server with a video processing function, for example, the server 200 in FIG. 1. FIG. 2 is a schematic structural diagram of a composition of an electronic device according to some embodiments. It may be understood that, FIG. 2 shows only an exemplary structure rather than all structures of the server. A part or all of the structure shown in FIG. 2 is implemented based on requirements.

An electronic device according to an embodiment of the disclosure includes: at least one processor 201, a memory 202, a user interface 203, and at least one network interface 204. Components in the electronic device 20 are coupled together by using a bus system 205. It may be understood that, the bus system 205 is configured to implement connection and communication among the components. In addition to a data bus, the bus system 205 further includes a power bus, a control bus, and a state signal bus. But, for ease of clear description, all types of buses in FIG. 2 are marked as the bus system 205.

The user interface 203 may include a display, a keyboard, a mouse, a track ball, a click wheel, a key, a button, a touch panel, a touchscreen, or the like.

It may be understood that, the memory 202 may be a volatile memory or a non-volatile memory, or may include both a volatile memory and a non-volatile memory. The memory 202 in some embodiments may store data to support operations of the terminal (e.g., terminal 10-1). Examples of the data include: any computer program for operating on the terminal (e.g., terminal 10-1), such as an operating system and an application program. The operating system includes various system programs, for example, a frame layer, a core library layer, and a drive layer, used for implementing various basic services and processing hardware-based tasks. The application program may include various application programs.

In some embodiments, the model-based data processing apparatus provided by some embodiments of the disclosure may be implemented in a combination of hardware and software. As an example, the model-based data processing apparatus provided by some embodiments of the disclosure may be a processor in the form of a hardware coding processor that is programmed to execute the model-based data processing method provided by some embodiments of the disclosure. For example, the processor in the form of a hardware coding processor may use one or more Application Specific Integrated Circuits (ASIC), a Digital Signal Processor (DSP), a Programmable Logic Device (PLD), a Complex Programmable Logic Device (CPLD), a Field-Programmable Gate Array (FPGA), or other electronic elements.

As an example of the model-based data processing apparatus provided by some embodiments is implemented using the combination of software and hardware, the model-based data processing apparatus provided by some embodiments of the disclosure may be directly embodied as a software module combinations executed by the processor 201. The software module may be located in the storage medium. The storage medium is located in the memory 202, the processor 201 reads the executable instructions included in the software module in the memory 202, and in combination with the necessary hardware (including, for example, the processor 201 and other components connected to bus 205) completes the model-based data processing method provided by the embodiment of the disclosure.

As an example, the processor 201 may be an integrated circuit chip, having a signal processing function, for example, a general purpose processor, a DSP, or other programmable logic device, discrete gate, or transistor logic device, discrete hardware component, or the like. The general purpose processor may be a microprocessor or any conventional processor.

The memory 202 in the embodiment of the disclosure is configured to store various types of data to support the operation of the electronic device 20. Examples of the data include: any executable instruction for the operation on the electronic device 20, where the program for implementing the model-based data processing method of the embodiment of the disclosure may be included in the executable instruction.

In some embodiments, the model-based data processing apparatus provided by some embodiments of the disclosure may be implemented using the software mode. FIG. 2 shows a model-based data processing apparatus 2020 stored in the memory 202, which may be software in the form of programs and plug-ins, and includes a series of modules. As an example of a program stored in the memory 202, it may include a model-based data processing apparatus 2020. The model-based data processing apparatus 2020 includes the following software modules: a sample obtaining module 2081, a feature extraction module 2082, a time sequence processing module 2083, a model training module 2084, and a model application module 2085. The model-based data processing method provided by some embodiments of the disclosure may be implemented when the software module in the model-based data processing apparatus 2020 is read into RAM by processor 201 and executed. The following introduces the functions of each software module in the training apparatus 2020 of the action recognition model.

The sample obtaining module 2081 is configured to extract a first training sample set, to obtain a second training sample set and a query video, the first training sample set comprising different types of video samples.

The feature extraction module 2082 is configured to process the second training sample set through an embedded layer network in an action recognition model to obtain a first frame feature sequence; and process the query video through the embedded layer network to obtain a second frame feature sequence.

The time sequence processing module 2083 is configured to process the first frame feature sequence through a time sequence relation network in the action recognition model to obtain a first time sequence relation descriptor; and process the second frame feature sequence through the time sequence relation network to obtain a second time sequence relation descriptor.

The model training module 2084 is configured to adjust a model parameter of the action recognition model according to the first time sequence relation descriptor and the second time sequence relation descriptor, the adjusted action recognition model being configured to recognize an action in a video to be recognized.

In some embodiments, the sample obtaining module 2081 is also configured to determine a use environment identifier of the action recognition model; determine historical data matching the use environment identifier of the action recognition model according to the use environment identifier; and use different types of video samples screened from the historical data as the first training sample set.

In some embodiments, the sample obtaining module 2081 is also configured to extract N types of video information from the first training sample set, where N is a positive integer; extract K video samples from each type of video information, where K is a positive integer; combine the N types of all video samples to obtain the second training sample set, where all video samples in the N types comprise N*K video samples; and extract at least one video sample from video information that is not extracted in the N types of video information, and use the extracted at least one video sample as the query video.

In some embodiments, the feature extraction module 2082 is also configured to extract each type of video frame set in the second training sample set and extract a first frame level feature vector corresponding to the video frame set through the embedded layer network in the action recognition model; determine a first channel quantity corresponding to the first frame level feature vector; determine a first frame level feature vector set corresponding to the first frame level feature vector and a similarity matrix matching the first frame level feature vector set based on the first channel quantity; fuse the first frame level feature vector set and the similarity matrix to obtain a second frame level feature vector set; and perform linear conversion on the second frame level feature vector set to obtain the first frame feature sequence.

In some embodiments, the feature extraction module 2082 is also configured to extract a third frame level feature vector from the query video through the embedded layer network; determine a second channel quantity corresponding to the third frame level feature vector; and determine a third frame level feature vector set corresponding to the third frame level feature vector based on the second channel quantity and perform linear conversion on the third frame level feature vector set to obtain the second frame feature sequence corresponding to the query video.

In some embodiments, the feature extraction module 2082 is also configured to obtain a down sampling result of the video frame set; and normalize the down sampling result through a full connection layer of the embedded layer network and perform deep analysis on normalization results of different image frames in the video frame set to obtain the first frame level feature vector.

In some embodiments, the feature extraction module 2082 is also configured to determine a video frame quantity, a feature channel quantity, a video frame height, and a video frame width corresponding to the first frame feature sequence; and perform spatiotemporal motion enhancement on each video frame in the first frame feature sequence according to the video frame quantity, the feature channel quantity, the video frame height, and the video frame width corresponding to the first frame feature sequence, the spatiotemporal motion enhancement being used for enhancing a motion feature of each video frame in the first frame feature sequence.

In some embodiments, the feature extraction module 2082 is also configured to determine a video frame quantity, a video channel quantity, a video frame height, and a video frame width corresponding to the second frame feature sequence; and perform spatiotemporal motion enhancement on each video frame in the second frame feature sequence according to a video frame parameter, a video channel parameter, a video frame height parameter, and a video frame width parameter corresponding to the second frame feature sequence, the spatiotemporal motion enhancement being used for enhancing a motion feature of each video frame in the second frame feature sequence.

In some embodiments, the time sequence processing module 2083 is also configured to determine a first frame index parameter of the first frame feature sequence and different sub-sequences of the first frame feature sequence; determine time sequence relation descriptors respectively corresponding to the different sub-sequences through the time sequence relation network in the action recognition model and by using the first frame index parameter; and combine the time sequence relation descriptors respectively corresponding to the different sub-sequences to obtain the first time sequence relation descriptor.

In some embodiments, the time sequence processing module 2083 is also configured to determine a second frame index parameter of the second frame feature sequence; and determine a second time sequence relation descriptor through the time sequence relation network and by using the second frame index parameter.

In some embodiments, the model training module 2084 is also configured to compare the first time sequence relation descriptor with the second time sequence relation descriptor to obtain a similarity between the first time sequence relation descriptor and the second time sequence relation descriptor; determine a weight parameter of different types of time sequence relation descriptors in the first time sequence relation descriptors according to the similarity between the first time sequence relation descriptor and the second time sequence relation descriptor; determine a sample prototype of different types of video samples according to the weight parameter of the time sequence relation descriptor; calculate a metric score of the query video and the sample prototype of each type of video samples; and determine a type of the video sample corresponding to the maximum metric score as a few-shot action type corresponding to the query video and based on the few-shot action type, adjust a model parameter of the action recognition model.

In some embodiments, the training apparatus also includes a model application module 2085, configured to determine a video frame sequence to be recognized in the video to be recognized; perform action recognition on the video frame sequence to be recognized through the adjusted action recognition model to obtain an action recognition result; determine a copyright video corresponding to the video to be recognized; determine an inter-frame similarity parameter set corresponding to the video to be recognized and the copyright video based on the action recognition result; obtain a video frame quantity meeting a similarity threshold in the inter-frame similarity parameter set; and determine a similarity between the video to be recognized and the copyright video based on the video frame quantity. In some embodiments, the model application module 2085 is further configured to, in a case of determining that the video to be recognized is similar to the copyright video based on the similarity between the video to be recognized and the copyright video, obtain copyright information of the video to be recognized; obtain a comparison result between the copyright information of the video to be recognized and the copyright information of the copyright video, the comparison result being used for determining compliance of the video to be recognized; and in a case that the comparison result represents that the copyright information of the video to be recognized is inconsistent with the copyright information of the copyright video, generate warning information.

In some embodiments, the model application module 2085 is further configured to, in a case of determining that the video to be recognized is not similar to the copyright video based on the similarity between the video to be recognized and the copyright video, determine the video to be recognized as a video to be recommended in a video source, where the video to be recommended carries a few-shot action recognition result; sort recall orders of all videos to be recommended in the video source; and correspondingly recommend a video to a target based on a sorting result.

According to the electronic device shown in FIG. 2, some embodiments also provide a computer program product, including a computer instruction or a computer program stored in a computer-readable storage medium. The processor of the electronic device reads the computer instruction or computer program from the computer-readable storage medium, and the processor executes the computer instruction or computer program, so that the electronic device performs the model-based data processing method provided by some embodiments of the disclosure.

By combining with the electronic device 20 shown in FIG. 2, the model-based data processing method provided by some embodiments is explained as follows. Firstly, the defects of the related technology are explained. When realizing the few-shot action recognition based on the frame level, the related technology combines depth information to carry out multi-mode feature fusion learning, and the learned features are stored in the computer-readable storage medium for additional storage. At the same time, a virtual character in the game engine is used for constructing a virtual action data set. However, in actual use, it is often difficult to collect enough mark samples for the action information of the character in the video for traditional machine learning to extract the motion pattern features from the data. As a result, overfitting of the model is easy to occur, and data enhancement operations such as data deformation would also easy to introduce new noises, affecting the data processing effect of the action recognition model. At the same time, virtual action data sets are collected, which improves the cost of training marks, rendering a large resource consumption of the training samples, so that a large resource consumption for training the action recognition model.

Figure 3:
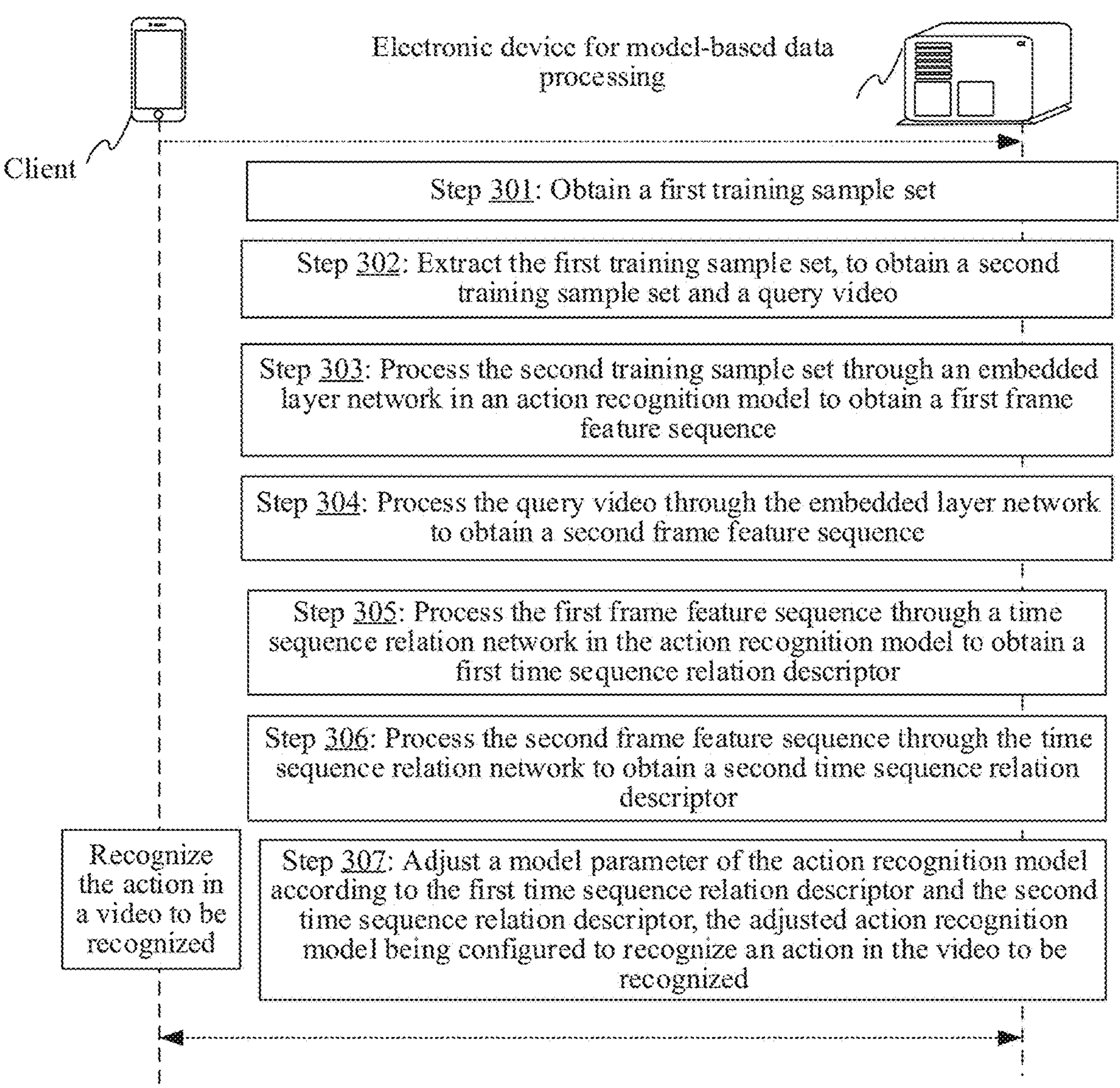
FIG. 3 is a flowchart of a model-based data processing method according to some embodiments.

FIG. 3 is a flowchart of a model-based data processing method according to some embodiments. A flow of the model-based data processing method is executed by the electronic device for training the action recognition model. Understandably, the operations shown in FIG. 3 may be performed by various electronic devices running model-based data processing devices for model-based data processing, such as dedicated terminals, servers, or server clusters with video processing functions. The model-based data processing method provided by some embodiments may be used for the training of non-real-time action recognition models, such as content analysis (including various video types such as TV series, movies, and short videos) and action recognition of the target characters. The operations shown in FIG. 3 are illustrated below.

Operation 301: Obtain a first training sample set.

Figure 4:
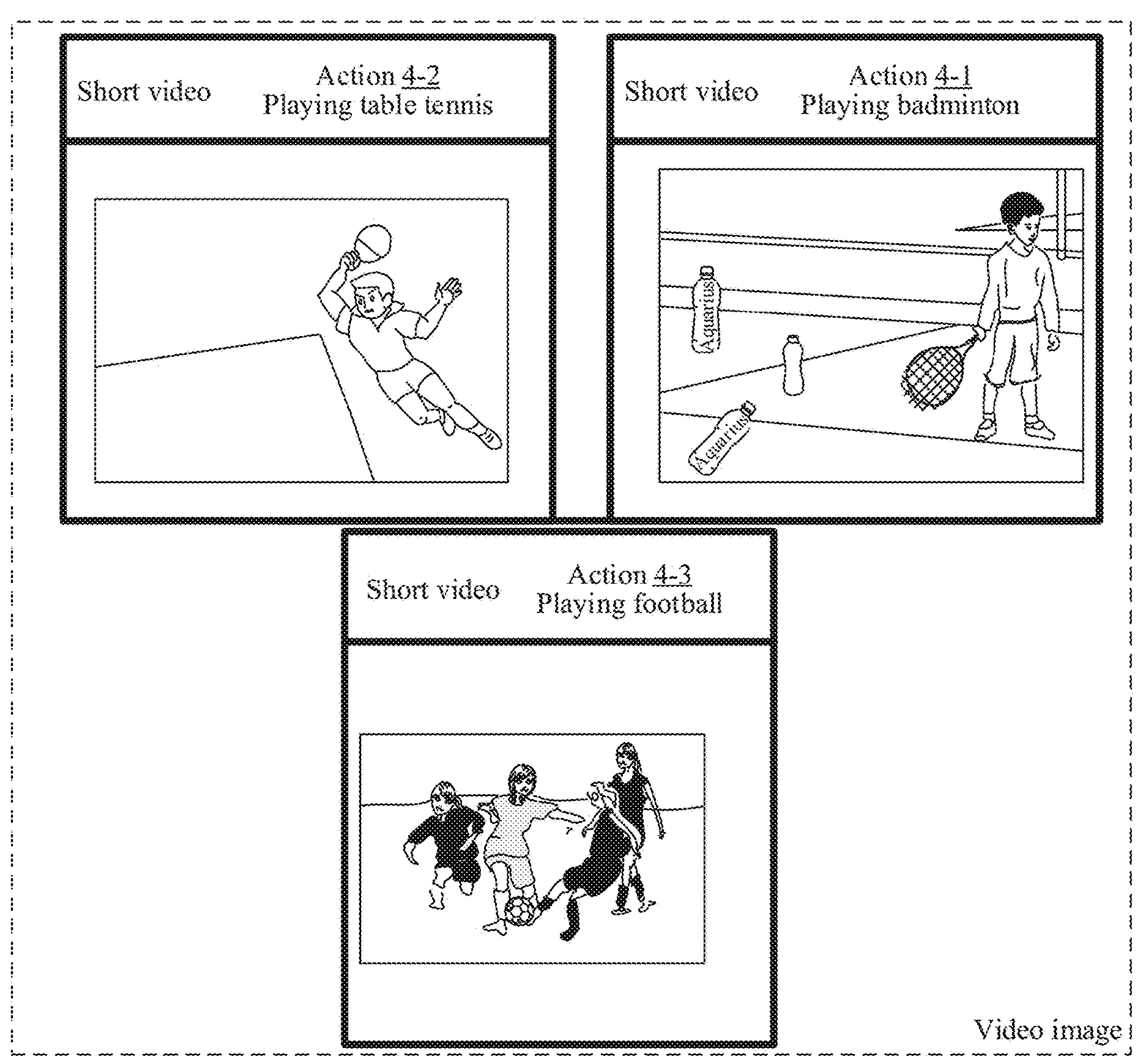
FIG. 4 is a schematic diagram of few-shot action video frame extraction according to some embodiments.

In some embodiments, the first training sample set includes different types of video samples obtained through the historical data. When obtaining the first training sample set, a use environment identifier of the few-shot action recognition model may be first determined. Historical data matching the use environment identifier of the action recognition model is determined according to the use environment identifier. Different types of video samples screened from the historical data are used as the first training sample set. Since the video source in the first training sample set is uncertain (it may be video resources in the Internet or local video files saved by the electronic device), the obtaining of few-shot actions may be realized by obtaining historical data matching the use environment. FIG. 4 is a schematic diagram of few-shot action video frame extraction according to some embodiments. As shown in FIG. 4, for the video image displayed in the video playback process with the time shaft passing, as shown in FIG. 4, the displayed video image has different target objects. The target objects in the video image are recognized. The region where the target object is located in different video frames of the video to be recognized may be determined. Since action 4-1 "playing badminton", action 4-2 "playing table tennis", and action 4-3 "playing football" respectively appear in three different short videos shown in FIG. 4, through the action recognition model trained by the model-based data processing method provided in the embodiment of the disclosure, action 4-1 "playing badminton", action 4-2 "playing table tennis" and action 4-3 "playing football" in three different short videos may be recognized, respectively. Furthermore, through the action recognition results of the target object, whether the video to be recognized is in compliance or conforms to the copyright information requirements is determined, so as to avoid the video uploaded by users from being played illegally and also prevent the recommendation and playing of the infringing videos.

Operation 302: Extract the first training sample set, to obtain a second training sample set and a search video.

In some embodiments, both the quantity of videos and the quantity of video types in the second training sample set are both at least one. For example, the quantity of videos or the quantity of video types may be determined by random numbers. The quantity of the query video is at least one. N types of video information may be extracted from the first training sample set. Moreover, K video samples are extracted from each type of video information, where K is a positive integer. The N types of all video samples are combined to obtain the second training sample set. Moreover, at least one video sample is extracted from video information that is not extracted in the N types of video information, and the extracted at least one video sample is used as the search video. N is a positive integer and K is a positive integer.

The action recognition model may be trained by the N-Way K-Shot training mode. N types are extracted from the video types of training data, and K video samples are extracted from each type. The second sample set is composed of N*K video samples. Then one or more video samples from the remaining video samples corresponding to the N types are selected as the query videos. Herein, each video sample in the second sample set and the query video are loosely sampled to divide the video sequence into T segments and a frame is extracted from each segment as a summary of the segment. Therefore, each video sample is represented by T frames of the frame sequence. The T frames of the frame sequence are inputted into the embedded layer network, to perform frame feature extraction processing and motion enhancement processing. The frame feature extraction processing and motion enhancement processing will continue to be explained later.

The extraction mode may be a random extraction mode, may also be a mode of extraction at specified intervals, may also be the combination of the two above, etc., which is not limited in the embodiments of the disclosure. In addition, N and K are positive integers. The N types of all video samples include N*K video samples.

Operation 303: Process the second training sample set through an embedded layer network in an action recognition model to obtain a first frame feature sequence.

In some embodiments, processing the second training sample set (referring to feature extraction) to obtain the first frame feature sequence may be implemented in the following ways: extracting each type of video frame set in the second training sample set and extracting a first frame level feature vector corresponding to the video frame set through the embedded layer network in the action recognition model; determining a first channel quantity corresponding to the first frame level feature vector; determining a first frame level feature vector set corresponding to the first frame level feature vector and a similarity matrix matching the first frame level feature vector set based on the first channel quantity; fusing the first frame level feature vector set and the similarity matrix to obtain a second frame level feature vector set; and performing linear conversion on the second frame level feature vector set to obtain the first frame feature sequence.

Given a set of video frames (called T frames of the frame sequence) in the second sample set, a feature extraction network may be used for extracting a series of frame-level features $F\{F_1, F_2 \ldots F_T\}$ on T-frames (including a set of video frames of few-shot actions corresponding to each video sample of each type), where $F_i \in F$ represents the frame-level features extracted on the i-th frame. Since each feature in F has d channels (called the first channel quantity), each feature in F may be expanded by channel, and T*d channel level features $$F^C\{F^c_{1*d}, F^c_{2*d} \ldots F^c_{T*d}\}$$

may be obtained.

In the fusion stage of frame-level features, a similarity matrix $s^F$ of $F^c$ is calculated to represent the appearance similarity between each feature in Fc. Then, for the i-th feature $F_i^c$ in $F^c$, all the features in $F^c$ are fused in $$F^C_{i*d}$$

according to $s^F$ to generate the corresponding enhanced feature $$F^e_{i*d}.$$

Herein, the generated enhanced features are represented as $$F^e\{F^e_{1*d}, F^e_{2*d} \ldots F^e_{T*d}\}.$$

The i-th enhanced feature in $$F^e_{i*d}$$

in $F^e$ obtained by calculation of formula 1, and the formula 1 is shown as follows:

$$F^e_{i*d} = F^e_{i*d} \sum_{f=1*d}^{T*d} S^F_{i*d,f} \cdot \theta(F^c_f),\ i = 1*d, 2*d, 3*d \ldots T*d; \quad \text{formula 1}$$

θ(•) represents a linear transformation function implemented by a full connection layer;

$$S^F_{i*d,f} \in S^F$$

represents a similarity of appearances between $$F^c_{i*d}$$

and $$F^c_{f*d},$$

and the calculation mode is as shown in formula 2.

$$S^F_{i*d,f} = \frac{\exp(a_{i*d,f})}{\sum_{f=1*d}^{n*d} \exp(a_{i*d,f})}; \quad \text{formula 2}$$

where exp is an activation function; $a_{i*d,f}$. It is a dot product result between $$F^c_{i*d}$$

and $$F^c_{j*d},$$

as shown in formula 3.

$$a_{i*d,f} = \langle \phi(F^c_{i*d}), \varphi(F^c_{f*d}) \rangle; \quad \text{formula 3}$$

ϕ(•) and φ(•) are two linear transformation functions with the same function as θ(•). Upon frame level feature fusion, the information in the i-th feature $$F^e_{i*d} \in F^e$$

is broadcast to other features in $F^e$, and therefore, each feature in $F^e$ may obtain the frame level feature from other frames, so as to enrich the information included in the obtained feature.

Operation 304: Process the query video through the embedded layer network to obtain a second frame feature sequence.

In some embodiments, a third frame level feature vector may be extracted from the query video through the embedded layer network. A second channel quantity corresponding to the third frame level feature vector is determined. A third frame level feature vector set corresponding to the third frame level feature vector is determined based on the second channel quantity and linear conversion is performed on the third frame level feature vector set to obtain the second frame feature sequence corresponding to the query video. Certainly, for the short video processing environment, a feature extractor may also be directly used (for example, the deep residual network ResNet), the video frame sequence is extracted as a frame level feature, for example, the video frame image features of the short video may be subject to feature extraction by using the pre-trained convolutional neural network based on deep residual network ResNet50, and the video frame image information of the short video may be extracted into 2048-dimension feature vectors. ResNet is conducive to the representation of video frame image information of the short video in image feature extraction. The video frame image information of the short video has great eye attraction before users watch it. Reasonable and appropriate video frame images of the short video may greatly improve the video playback click rate.

In some embodiments, Vector of Locally Aggregated Descriptors (NetVLAD) may also be used for feature extraction, to generate the video frame image into 128-dimension feature vectors. In video viewing, the video frame information reflects the specific content of the video and quality of the video, and is directly associated with the viewing duration of the user. When the action recognition model is configured on the video server, the frame level feature vector obtaining mode may be flexibly configured according to different usage requirements.

Operation 305: Process the first frame feature sequence through a time sequence relation network in the action recognition model to obtain a first time sequence relation descriptor.

In some embodiments before processing the first frame feature sequence (i.e., obtaining the time sequence relation descriptor) to obtain the first time sequence relation descriptor, in order to enhance the motion features of the sample, the frame level feature vector (called the first frame feature sequence) obtained may also be processed for spatiotemporal motion enhancement.

In spatiotemporal motion enhancement processing, the embedded layer network of the action recognition model includes the feature extractor and the spatiotemporal motion enhancement (for example, STME) module. The embedded layer network of the action recognition model is used for mapping the input video to a new feature space, so as to facilitate the time sequence relation network to continue processing.

In some embodiments, a video frame quantity, a video channel quantity, a video frame height, and a video frame width corresponding to the first frame feature sequence may be determined. Spatiotemporal motion enhancement is performed on each video frame in the first frame feature sequence according to the video frame quantity, the feature channel quantity, the video frame height, and the video frame width corresponding to the first frame feature sequence, to implement the enhancement of the motion feature of each video frame in the first frame feature sequence.

Since the motion information may be measured by the content displacement of two continuous frames, the information from all the spatiotemporal content displacement positions is used for enhancing the motion information of each region position of the sample feature during the processing of spatiotemporal motion enhancement. For example, the input feature $S \in R^{T \times C \times H \times W}$ (the first frame feature sequence) is given, where T refers to the video frame quantity, C refers to the feature channel quantity, and H and W respectively refer to the video frame height and video frame width.

Firstly, different learnable convolutional layers are used respectively to map the input features to different spaces, while the feature channel quantity is reduced at the same time for efficient calculation. The mapped feature content displacement may be expressed as formula 4, which is shown below.

$$d(t) = conv_2(S_{t+1}) - conv_3(S_t),\ 1 \le t \le T-1; \quad \text{formula 4}$$

$d(t) \in R^{T \times C/k \times H \times W}$, k is the reduction ratio of the feature channel quantity, for example, 8; d(t) represents the content displacement information at moment t; conv2 and $conv_3$ respectively are two 1*1*1 spatiotemporal convolutions; $S_{t+1}$ represents the frame feature of t+1 frame in S; and $S_t$ represents the frame feature of t frame in S. The content displacement information of t=T (the last moment) is set to be 0, i.e., d(T)=0, the final motion matrix D=[d(1), . . . d(T)] may be obtained by splicing all the feature content displacements along the time sequence dimension. Therefore, a time sequence self-attention of each position in the motion matrix may be calculated by formula 5:

$$a_{p,j} = \frac{\exp(m_{p,ji})}{\sum_{i=1}^{T}\exp(m_{p,ji})},\ m_{p,ji} = D_{p,i}^{Z} D_{p,j}; \quad \text{formula 5}$$

$a_{p,ji}$ represents the correlation of each position p in D on the j-th frame and the i-th frame; $D_{p,j}$ represents the feature content displacement of each position p in D on the j-th frame; $D_{p,i}$ represents the feature content displacement of each position p in D on the i-th frame; and Z represents transpose processing.

Then, the attentional mechanism is applied to conv1 (S) to obtain the transformation feature map of S in conv1 (S) feature space, where $conv_1$ is a 1*1*1 spatiotemporal convolution.

Finally, the output corresponding to the attention mechanism is multiplied by the scalar parameter λ, and the original input feature is then added to retain the background information. Therefore, the spatiotemporal motion enhancement processing process may be represented as formula 6, which is shown below.

$$V_{p,j} = \lambda \sum_{i=1}^{T} a_{p,ji} conv_l(S_{p,i}) + S_{p,j}; \quad \text{formula 6}$$

Sp,i and Sp,j respectively represent information of position p in the i-th frame and the j-th frame in S; $V_{p,j}$ represents information of position p in the j-th frame after being enhanced. The final output of the spatiotemporal motion enhancement module is the frame feature V, $V \in R^{T \times C \times H \times W}$ after spatiotemporal motion enhancement.

Similarly, with reference to the processes of formula 4 to formula 6, a video frame quantity, a video channel quantity, a video frame height, and a video frame width corresponding to the second frame feature sequence may also be determined. Spatiotemporal motion enhancement is performed on each video frame in the second frame feature sequence according to the video frame quantity, the feature channel quantity, the video frame height, and the video frame width corresponding to the second frame feature sequence, for enhancing a motion feature of each video frame in the second frame feature sequence. With this regard, after spatiotemporal motion enhancement processing, every feature frame in V has realized motion enhancement. After motion enhancement processing, based on the first frame feature sequence after motion enhancement processing and the second frame feature sequence after motion enhancement processing, operation 305 is executed to calculate the time sequence relation descriptor corresponding to the parts.

The process of obtaining the time sequence relation descriptor is explained.

Firstly, the time relation descriptor between frames (called frame index parameter 2≤n≤T) is first determined, and then multiple groups of n-frame sub-sequences are obtained from the frame feature sequence. l groups of n-frame sub-sequences (called different sub-sequences) are continued to be randomly extracted from multiple groups of n-frame sub-sequences, and l groups of n-frame sub-sequences are mapped into vectors for addition processing; finally the time relation descriptor of the n-frame sub-sequences is obtained. Referring to formula 7, for the frame feature sequence V after spatiotemporal motion enhancement, its length is T. The time relation descriptor of n-frame sub-sequence may be determined by formula 7, as shown below.

$$R_n(V) = \sum_l g\phi(n)((V^n)_l); \quad \text{formula 7}$$

$(V^n)_l = \{v_a, v_b\ .\ .\ .\ \}_l$, is the l-th group of n-frame sub-sequences sampled from V, which consists of n frame features sorted by time; a and b are frame indexes. gϕ(n) function is used for learning the corresponding time sequence relation from the n-frame sub-sequences. Herein, the gϕ(n) function is implemented by a full connection layer; the n-frame sub-sequences are mapped to a vector. In order to enhance the learned time sequence relation, l groups of time sequence relations may be accumulated to obtain the final time sequence relation descriptor $R_n$ (called the first time sequence relation descriptor). Since the time sequence relation needs to be captured from at least two frames, n may be 2 minimally.

To fully extract dynamics in video samples, the time sequence relation may be captured on multiple time scales. For the frame feature sequence corresponding to the video frame sequence with length T, multiple groups of time sequence relation descriptors may be generated therefrom, so that the final sample level feature X (called the first time sequence relation descriptor) is composed of all time sequence relation descriptors, that is $X=\{R_2, R_3\ .\ .\ .\ R_n\}$, and n is less than or equal to T. In this way, action information in the video may be captured in multiple time scales, and the captured dynamic information may be encoded as features to represent action features in a robust way.

Operation 306: Process the second frame feature sequence through the time sequence relation network to obtain a second time sequence relation descriptor.

In some embodiments of the disclosure, a second frame index parameter of the second frame feature sequence may be determined. A second time sequence relation descriptor is determined through the time sequence relation network and by using the second frame index parameter. In addition, the process of obtaining the second time sequence relation descriptor is similar to the process of obtaining the first time sequence relation descriptor, which is no longer repeated and described herein by the embodiment of the disclosure.

Operation 307: Adjust a model parameter of the action recognition model according to the first time sequence relation descriptor and the second time sequence relation descriptor, the adjusted action recognition model being configured to recognize an action in a video to be recognized.

In some embodiments of the disclosure, a model parameter of the action recognition model is adjusted to recognize an action in a video through the adjusted action recognition model. The model parameter adjusting process may be implemented by the following modes: comparing the first time sequence relation descriptor with the second time sequence relation descriptor to obtain a similarity between the first time sequence relation descriptor and the second time sequence relation descriptor; determining a weight parameter of different types of time sequence relation descriptors in the first time sequence relation descriptors according to the similarity between the first time sequence relation descriptor and the second time sequence relation descriptor; determining a sample prototype of different types of video samples according to the weight parameter of the time sequence relation descriptor; calculating a metric score of the query video and the sample prototype of each type of video samples; and determining a type of the video sample corresponding to the maximum metric score as a few-shot action type corresponding to the query video and based on the few-shot action type, adjusting a model parameter of the action recognition model.

Since there is an action distortion in the same type of videos, for example, under the condition that the quantity of video samples provided by the type is less than the threshold, the difference within the type will easily lead to a determining error between the types. In order to reduce the occurrence of this situation, the importance of time sequence relation descriptors of different video samples in the same type may be determined. In this way, greater weight may be given to the time sequence relation descriptors of video samples with stronger discriminant power in the same type, so as to obtain the final type prototype.

In the meta-learning process, each new type of learning is task-related, and thus, a corresponding attention prototype may be generated for each task. The discriminant power of the time sequence relation descriptor of each video sample is measured by the similarity between it and the second time sequence relation descriptor of the query video, and is obtained by calculating by the Cosine similarity function g, so that the corrected weighted prototype may be obtained according to the discriminant power of the time sequence relation descriptor of each video sample.

In the first time sequence relation descriptor corresponding to the second training sample set, the time sequence relation descriptor corresponding to the h-th (1≤h≤N) type is $\{x_{h1}, x_{h2}, \ldots x_{hK}\}$; K represents the quantity of video samples of the h-th type. The calculation of the weight of the time sequence relation descriptor of each video sample refers to formula 8, which is shown below.

$$\gamma_{hr}^{n} = \frac{\exp(g(q^{n}, x_{hr}^{n}))}{\sum_{r=1}^{K}\exp(g(q^{n}, x_{hr}^{n}))}, \quad h = 1 \ldots N, r = 1, \ldots K, n = 2, \ldots T; \qquad \text{formula 8}$$

$$X_{hr}^{n}$$

represents the time sequence relation descriptor of n frames of the r-th video sample of type h. Then, the weight of the time sequence relation descriptor of n frames of the h-th type of video sample r may be calculated as $$\gamma_{hr}^{n}.$$

For type h, the corresponding prototype is composed of the weighted summing results of a series of time sequence relation descriptors (called weighted descriptors). The weighted descriptors $$p_{h}^{n}$$

of n frames of type h may be represented by formula 9, which is as shown below.

$$p_{h}^{n} = \sum_{r}^{K}\gamma_{hr}^{n}x_{hr}^{n}; \qquad \text{formula 9}$$

Therefore, the set of weighted descriptors of n frames of all video samples of type h constitutes the final type prototype of n frames of type h. The prototype $q^n$ of n frames of the query video is compared with the prototype $$p_{h}^{n}$$

(called the weighted descriptor) of the n frames of the second training sample set, and the comparison process may be represented by formula 10, which is as shown below.

$$P_{\theta}(h_{pre} = h \mid q) = \frac{\exp\left(\sum_{n=2}^{T}g(p_{h}^{n}, q^{n})\right)}{\sum_{h=1}^{N}\exp\left(\sum_{n=2}^{T}g(p_{h}^{n}, q^{n})\right)}; \qquad \text{formula 10}$$

$P_{\theta}(h_{pre}=h|q)$ is a similarity between the prototype $q^n$ of the query video and the type prototype $$p_{h}^{n}$$

of n frames of the second training sample set.

The sum of similarity between the prototype $q^n$ of the query video and type prototypes $$p_h^n$$

of each group (groups 2 to T) is the measurement score of this type, where the type corresponding to the highest measurement score is the prediction type. When the measurement score of the sample prototype of the video sample reaches the highest, the type corresponding to the highest measurement score is determined as the few-shot action type corresponding to the query video, and the model parameters of the action recognition model are adjusted based on the few-shot action type corresponding to the query video, so as to complete the training of the action recognition model to implement the action recognition in the video by the trained action recognition model.

Figure 5:
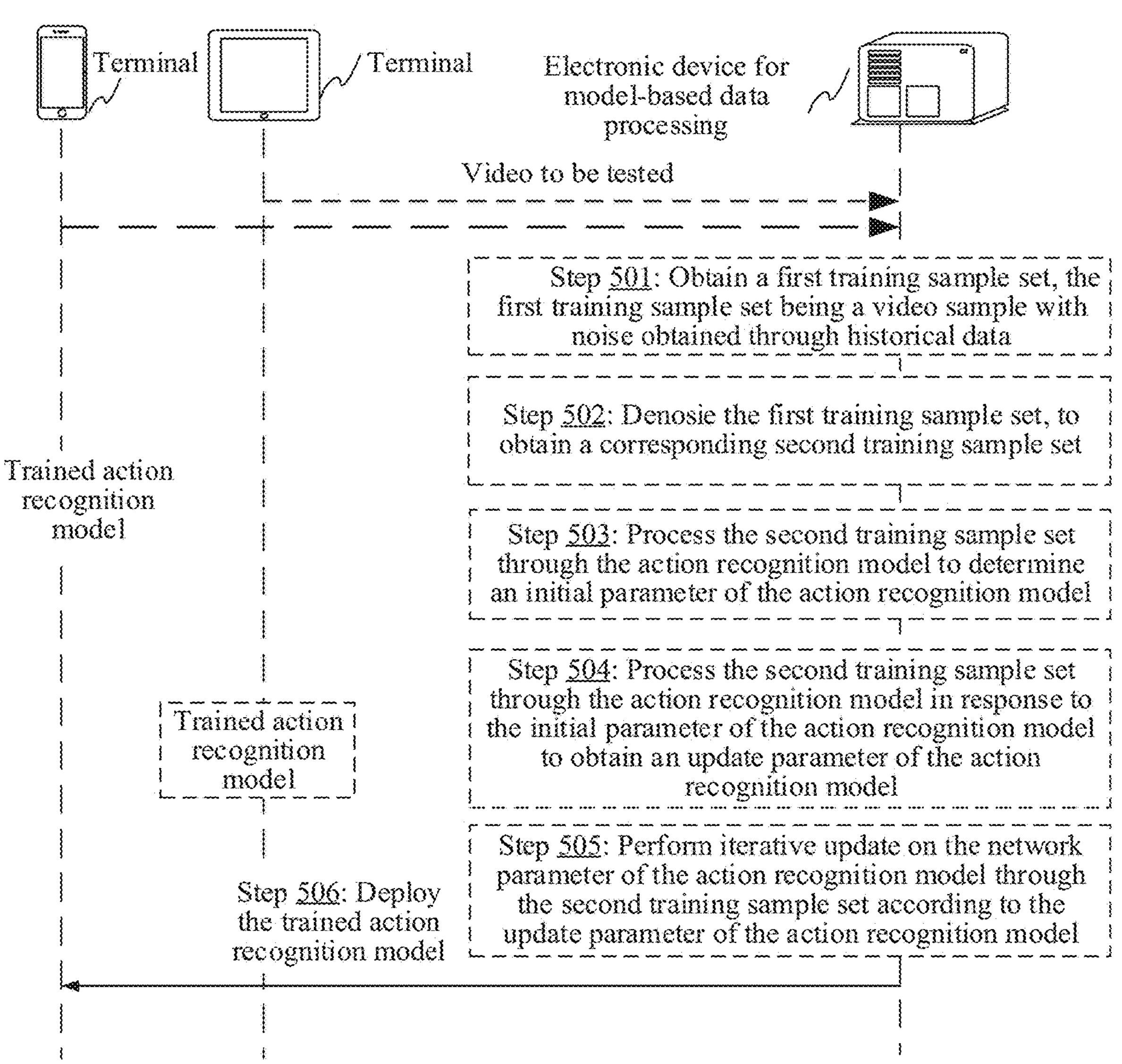
FIG. 5 is another flowchart of a model-based data processing method according to some embodiments.

Continuously combining the electronic device 20 shown in FIG. 2 to explain the model-based data processing method according to some embodiments, FIG. 5 is another flowchart of a model-based data processing method according to some embodiments. As may be understood, the operations shown in FIG. 5 may be performed by various servers running the video processing function, where the video processing function is implemented by deploying the trained action recognition model in the server to recognize the similarity of the uploaded video, so as to recognize the compliance of the copyright information of the video. Of course, before deploying the trained action recognition model, the training process of the action recognition model is also included. The training process of the action recognition model may include operation 501 to operation 506. The following operations are described, respectively.

Operation 501: Obtain a first training sample set, the first training sample set being a video sample with noise obtained through historical data.

Operation 502: Denoise the first training sample set, to obtain a corresponding second training sample set.

Operation 503: Process the second training sample set through an action recognition model to determine an initial parameter of the action recognition model.

Operation 504: Process the second training sample set through the action recognition model in response to the initial parameter of the action recognition model to obtain an update parameter of the action recognition model.

Different video samples in the second training sample set may be substituted into the loss function corresponding to the action recognition model. The update parameters of the action recognition model are obtained when the loss function meets the corresponding convergence condition. The convergence condition may be reaching an accuracy index threshold, may a training time threshold, a training duration threshold, or may further be the combination of the above, etc., which is not limited in the embodiments of the disclosure.

Operation 505: Perform iterative update on the network parameter of the action recognition model through the second training sample set according to the update parameter of the action recognition model.

When the action recognition model is trained, the loss function such as cross entropy approaches the correct trend until the loss function reaches the corresponding convergence condition.

In some embodiments, the embedded layer network in the action recognition model may also use a ResNet-101 model or a lightweight network model (e.g., the ResNext-101 model). The ResNext-101 model uses a user mark image on a social application as a pre-trained data set, which may reduce the resource consumption for obtaining a data label, and improve an obtaining efficiency of the data label. Moreover, during training, by fine-tuning, the performance of the model may exceed the highest (State Of The Art (SOTA)) level of the baseline model (for example, an ImageNet model), which may improve the application scope of the action recognition model.

Operation 506: Deploy the trained action recognition model (referred to as the adjusted action recognition model).

In some embodiments, the deployed and trained action recognition model may be used (for example, it may be deployed in the server or cloud server of the video client operator) to perform the corresponding action recognition and realize the recognition of the video uploaded by the user.

Figure 6:
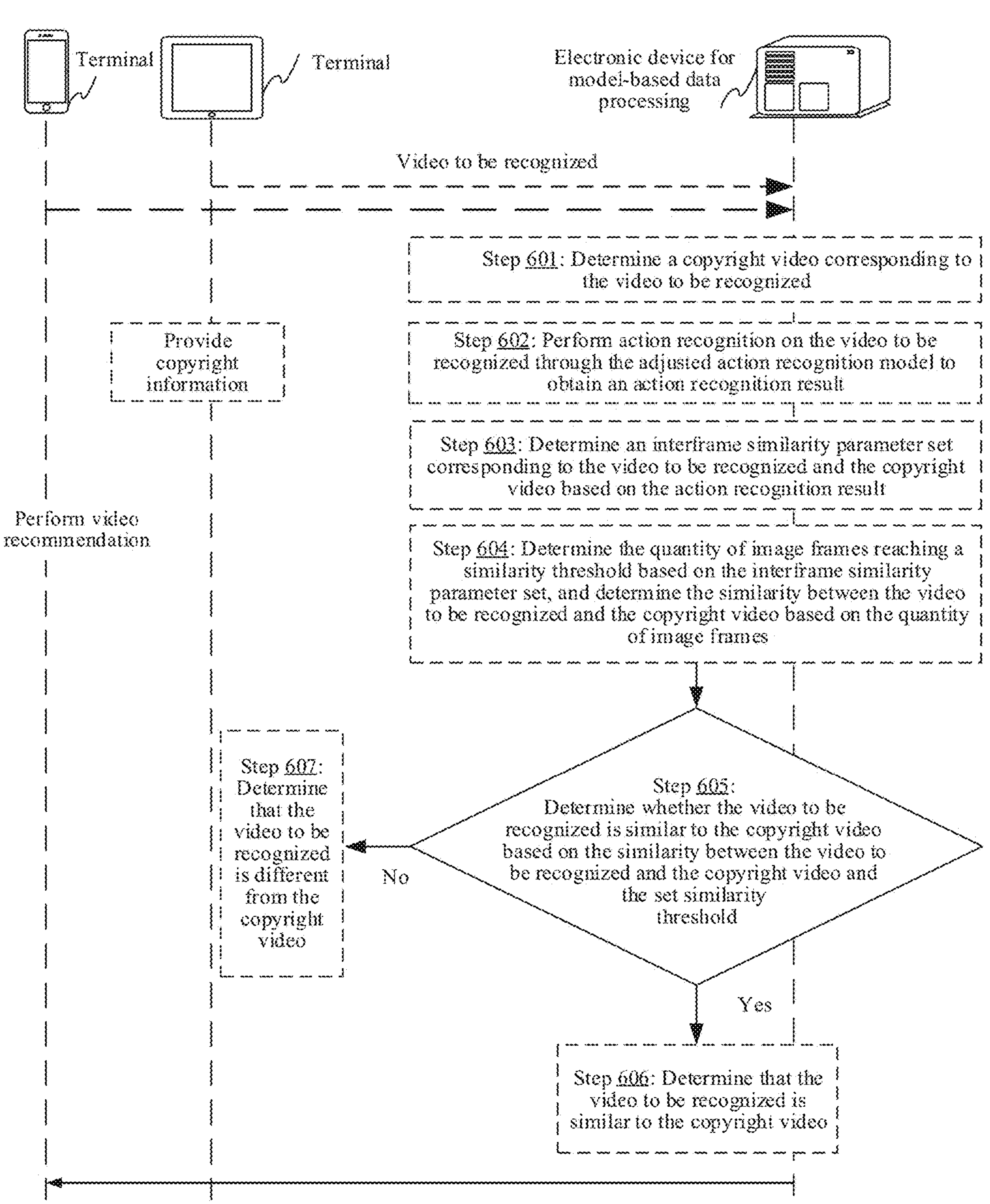
FIG. 6 is a schematic diagram of video similarity determining according to some embodiments.

FIG. 6 is a schematic diagram of video similarity determining according to an embodiment of the disclosure. As shown in FIG. 6, one video similarity determining process may include operation 601 to operation 607. Various operation are respectively explained as follows.

Operation 601: Determine a copyright video corresponding to the video to be recognized.

Operation 602: Perform action recognition on the video to be recognized through the adjusted action recognition model to obtain an action recognition result.

Operation 603: Determine an inter-frame similarity parameter set corresponding to the video to be recognized and the copyright video based on the action recognition result.

Operation 604: Determine the quantity of image frames reaching a similarity threshold based on the inter-frame similarity parameter set, and determine the similarity between the video to be recognized and the copyright video based on the quantity of image frames.

Operation 605: Determine whether the video to be recognized is similar to the copyright video based on the similarity between the video to be recognized and the copyright video and the set similarity threshold. If yes, perform operation 606; if not, perform operation 607.

Operation 606: Determine that the video to be recognized is similar to the copyright video.

In a case of determining that the video to be recognized is similar to the copyright video, copyright information of the video to be recognized is obtained. Compliance of the video to be recognized is determined through the copyright information of the video to be recognized and the copyright information of the copyright video. In a case that the copyright information of the video to be recognized is inconsistent with the copyright information of the copyright video, warning information is generated. Moreover, when the copyright information of the video to be recognized is consistent with the copyright information of the copyright video, it is determined that the video to be recognized is in compliance. Therefore, by recognizing the region where the video target is located in different video frames of the video to be recognized, whether the copyright video is stolen is determined.

Operation 607: Determine that the video to be recognized is different from the copyright video.

In a case of determining that the video to be recognized is not similar to the copyright video, the video to be recognized is added to a video source to be used as the video to be recommended. Recall orders of all videos to be recommended are sorted in the video source. Videos are recommended to the target object based on a sorting result of the recall orders of all videos to be recommended. Therefore, by recognizing the region where the video target is located in different video frames of the video to be recognized, the corresponding copyright video is determined and recommended to the user to enrich video viewing options of the user.

In some embodiments, recognition information corresponding to the video to be recognized may also be determined. Based on the region where the video target is located in different video frames of the video to be recognized, a matching degree between the video to be recognized and the recognition information is determined. When the matching degree between the video to be recognized and the recognition information is lower than an alarm threshold, the compliance of the region where the video target is located in different video frames of the video to be recognized is recognized. In this way, manual participation in the video review process may be reduced, the efficiency of video compliance recognition is improved, the cost of recognition is reduced, and at the same time, the waiting time of the user is reduced.

Figure 7:
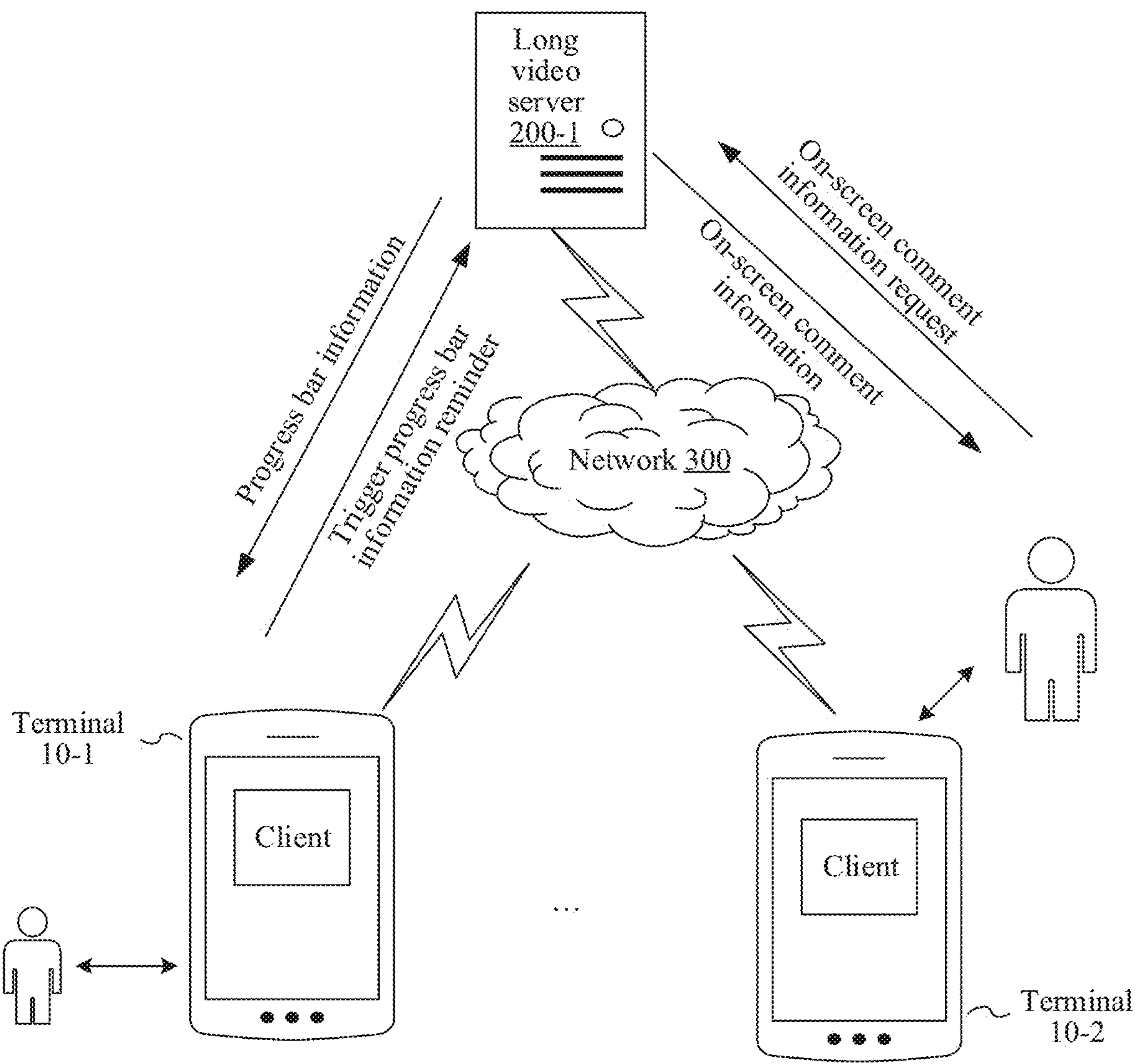
FIG. 7 is a schematic diagram of a use scene of a model-based data processing method according to some embodiments.

Since the number of videos in the video server is constantly increasing, the copyright information of the video may be saved in the blockchain network or cloud server to realize the judgment of video similarity. The similarity determining process may be realized in combination with Cloud Technology or blockchain network technology. Cloud technology refers to a hosting technology that integrates hardware, software, network and other series resources in a WAN or local area network to realize data calculation, storage, processing and sharing. It may also be understood as the general term of network technology, information technology, integration technology, management platform technology and application technology based on cloud computing business model application. In addition, since background services require a large amount of computing and storage resources, such as video websites, image websites and more portal websites, cloud technology is supported by cloud computing. The following illustrates the model-based data processing method provided in the embodiment of the disclosure by taking the implementation environment of the action preview on-screen comment and the action preview in the progress bar information of a long video as an example. FIG. 7 is a schematic diagram of a use scene of a model-based data processing method according to some embodiments. As shown in FIG. 7, the terminal (for example, terminals 10-1 and 10-2) is provided with a client that may play corresponding long videos. For example, a client or plug-in that plays long videos may obtain and display long videos with on-screen comment information (obtained by requesting on-screen comment information) and progress bar information (obtained by triggering progress bar reminder) through the corresponding client. The terminal is connected to the long video server 200-1 through the network 300 (the example of server 200 in FIG. 1). Certainly, the user could also upload the video through the terminal for other users in the network to view; in this process, the video server of the operator recognizes the provided video through the action recognition model, so as to recognize the actions in the video and form the recognized actions into the action preview on-screen comment or the action preview in the progress bar information.

Figure 8:
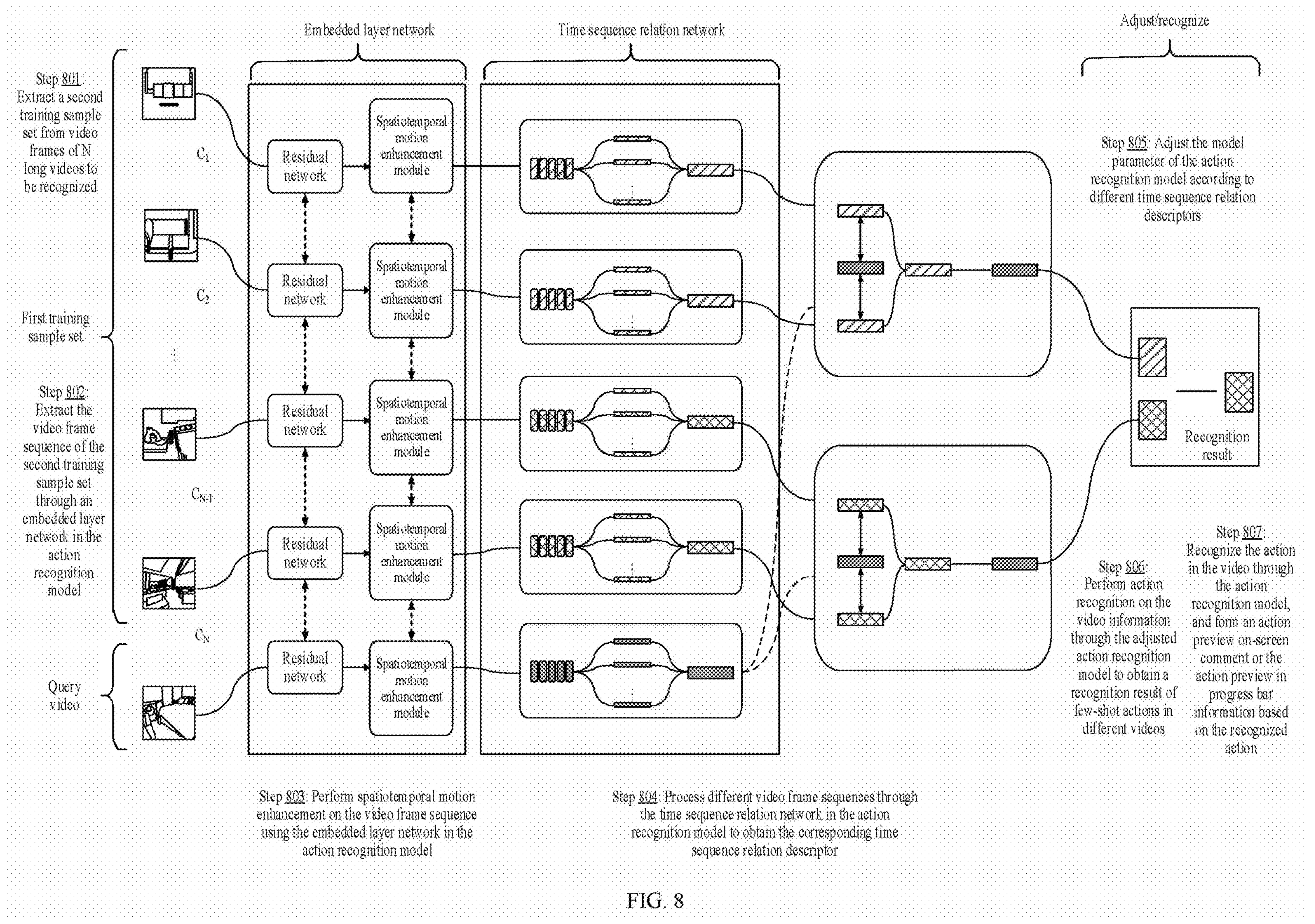
FIG. 8 is a schematic diagram of an exemplary video recognition process according to some embodiments.

FIG. 8 is a schematic diagram of an exemplary video recognition process according to an embodiment of the disclosure. As shown in FIG. 8, the exemplary video recognition process includes operation 801 to operation 807. Various operation are respectively explained as follows.

Operation 801: Extract a second training sample set from video frames of N long videos to be recognized.

When the N long videos to be recognized are 3 long videos to be recognized, the second training sample set at least includes: video frames of action 1 "playing badminton" in the first video, action 2 "playing table tennis" in the second video, and action 3 "playing basketball" in the third video.

Operation 802: Respectively extract the second training sample set and the video frame sequence of the query video through an embedded layer network in the action recognition model.

The video frame sequence includes the video frame sequence corresponding to N types of video samples (C1 to CN) and the video frame sequence of the query video.

Operation 803: Use the embedded layer network in the action recognition model to perform spatiotemporal motion enhancement on the video frame sequence.

The embedded layer network includes Residual Network (ResNet) and Spatiotemporal Motion Enhancement Module (STME).

Spatiotemporal motion enhancement is performed for enhancing a motion feature of each video frame in the first frame feature sequence.

Operation 804: Process the different video frame sequences through a time sequence relation network in the action recognition model to obtain corresponding time sequence relation descriptors.

Operation 805: Adjust a model parameter of the action recognition model according to different time sequence relation descriptors.

Operation 806: Perform action recognition on the video information through the adjusted action recognition model to obtain a recognition result of few-shot actions in different videos.

Operation 807: Recognize the action in the video through the action recognition model, and form an action preview on-screen comment or the action preview in progress bar information based on the recognized action.

Figure 9:
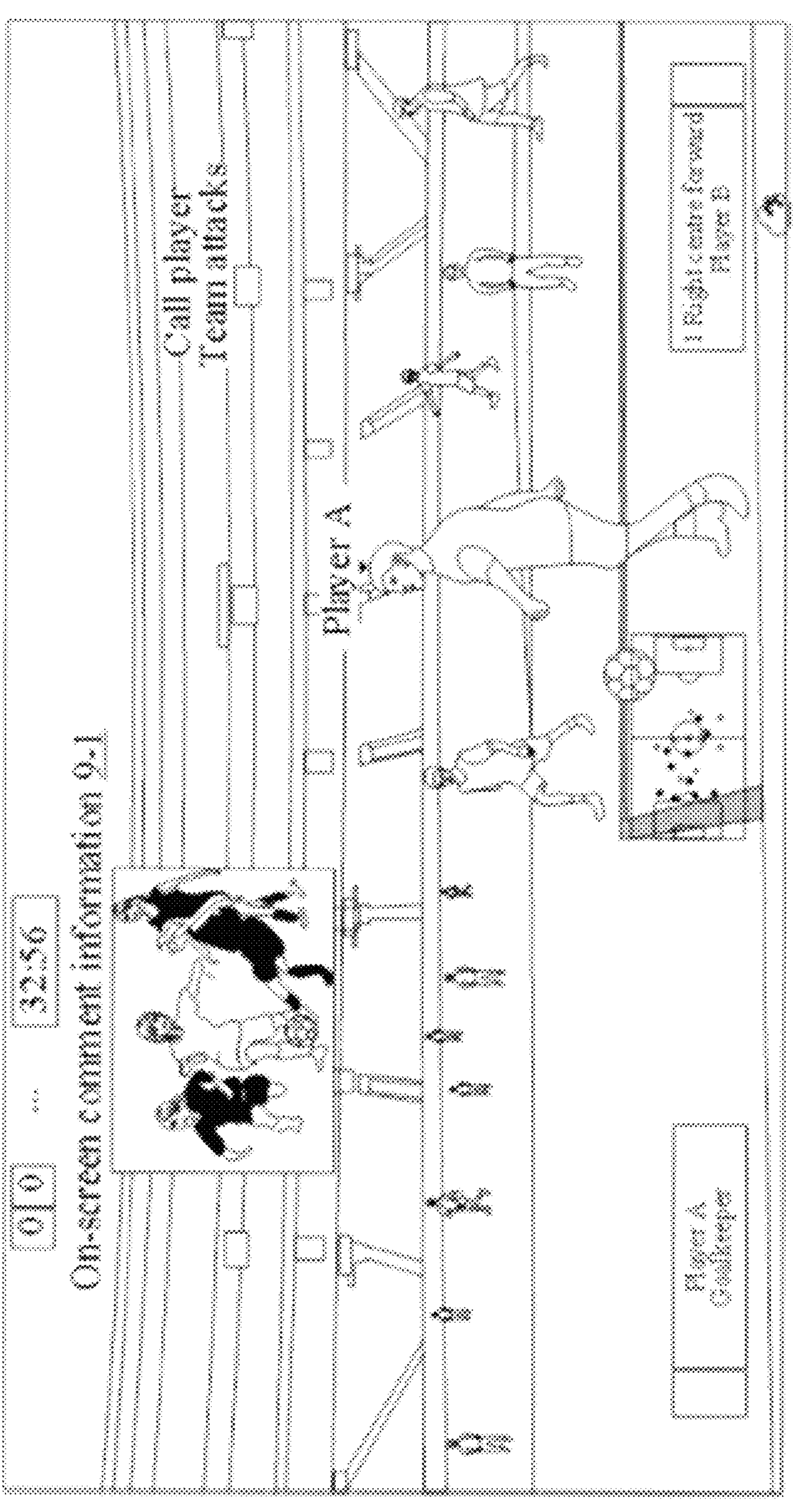
FIG. 9 is a schematic flowchart of a process of a video target recognition method according to some embodiments.

As shown in FIG. 9, the action in the video is recognized through the adjusted action recognition model to form the action preview on-screen comment (the on-screen comment information 9-1 as shown in FIG. 9); the action preview on-screen comment may be displayed at a video playing interface.

The adjusted action recognition model obtained from the model-based data processing method provided in the embodiment of the disclosure is capable of robust and accurate recognition of few-shot actions in the video. The test is conducted on the adjusted action recognition model data sets (e.g., data set MiniKinetics, data set UCF101, and data set HMDB51). The test results are shown in Tables 1 and 2. Table 1 shows baseline model 1 to baseline model 10 as well as the adjusted action recognition model. The results obtained from tests respectively by means of one shot to five shots from the data set (the data set MiniKinetics) are included. Table 2 shows the baseline model 1, baseline model 8, baseline model 10, baseline model 11, and the adjusted action recognition model. The results obtained from tests respectively by means of one shot, three shorts, and five shots from the data set (the data set UCF101 and the data set HMDB51) are included. It may be seen from Table 1 and Table 2 that compared with the baseline model 1 to baseline model 10, the adjusted action recognition model provided by the embodiment of the disclosure achieves the highest recognition accuracy on all of the three data sets. Table 1 and Table 2 are shown as follows.

TABLE 1

| Methods | 1-shot | 2-shot | 3-shot | 4-shot | 5-shot |
|---|---|---|---|---|---|
| Baseline model 1 (BaseNet) | 66.4 | 76.2 | 79.9 | 81.6 | 83.3 |
| Baseline model 2 (Matching Net) | 53.3 | — | — | — | 74.6 |
| Baseline model 3 (MAML) | 54.2 | — | — | — | 75.3 |
| Baseline model 4 (CMN) | 60.5 | 70.0 | 75.6 | 77.3 | 78.9 |
| Baseline model 5 (TARN) | 66.6 | 74.6 | 77.3 | 78.9 | 80.7 |
| Baseline model 6 (CFA) | 69.9 | — | 80.5 | — | 83.1 |
| Baseline model 7 (Embodied Learning) | 67.8 | 77.8 | 81.1 | 82.6 | 85.0 |
| Baseline model 8 (ARN) | 63.7 | — | — | — | 82.4 |
| Baseline model 9 (TAM) | 73.0 | — | — | — | 85.8 |
| Baseline model 10 (AMeFu-Net) | 74.1 | 81.1 | 84.3 | 85.6 | 86.8 |
| Adjusted action recognition model (TRAPN) | 75.1 | 82.2 | 84.8 | 86.1 | 87.0 |

TABLE 2

| | Data set | | | | | |
|---|---|---|---|---|---|---|
| | Data set (UCF101) | | | Data set (HMDB51) | | |
| Methods | 1-shot | 3-shot | 3-shot | 4-shot | 5-shot | 5-shot |
| Baseline model 1 (BaseNet) | 78.6 | 90.2 | 92.7 | 48.9 | 62.4 | 67.9 |
| Baseline model 11 (ProtoGAN) | 62.3 | 75.6 | 80.5 | 35.7 | 46.6 | 51.5 |
| Baseline model 8 (ARN) | 66.3 | — | 83.1 | 45.5 | — | 60.6 |
| Baseline model baseline model 10 (AMeFu-Net) | 85.1 | 93.1 | 95.5 | 60.2 | 71.5 | 75.5 |
| Adjusted action recognition model (TRAPN) | 86.6 | 93.4 | 95.9 | 61.3 | 72.9 | 76.8 |

Beneficial technical effects: some embodiments relate to firstly extracting the second training sample set and the query video from the first training sample set including different types of video samples as training data, then obtaining the first time sequence relation descriptor through the first frame feature sequence of the second training sample set, obtaining the second time sequence relation descriptor through the second frame feature sequence of the query video, and finally, adjusting the model parameters of the action recognition model according to the first time sequence descriptor and the second time sequence descriptor. Since the first time sequence relation descriptor and the second time sequence relation descriptor used in the adjustment process represent the time sequence relation between the video frame sequences, and since the action occurring in the video corresponds to a certain time sequence, by mining the time sequence relation between the video frame sequences and adjusting the parameters of the action recognition model through the time sequence relation descriptor, the adjusted action recognition model may accurately recognize the actions in the video, enhancing the generalization of the model and improving the accuracy of the action recognition model.

It may be understood that, in the embodiment of the disclosure, video and other related data are involved. When the embodiment of the disclosure is applied to specific products or technologies, user permission or consent shall be obtained, and the collection, use, and processing of related data shall comply with relevant laws, regulations, and standards of relevant countries and regions.

The foregoing descriptions are merely embodiments of the disclosure, but are not intended to limit the scope of protection of the disclosure. Any modification, equivalent replacement and improvement made within the spirit and principle of the disclosure shall fall within the protection scope of the disclosure.

What is claimed is:

1. A model-based data processing method, performed by at least one processor, the method comprising:

extracting a first training sample set in order to obtain a second training sample set and extract, as a query video, at least one video sample that is not included in the first training sample set, the first training sample set comprising a variety of types of video samples, the second training sample set obtained by combining the variety of types of video samples in the first training sample set;

processing the second training sample set through an embedded layer network in an action recognition model to obtain a first frame feature sequence, the first frame feature sequence comprising a first plurality of frames;

processing the query video through the embedded layer network to obtain a second frame feature sequence, the second frame feature sequence comprising a second plurality of frames;

processing the first frame feature sequence through a time sequence relation network in the action recognition model to obtain a first time sequence relation descriptor;

processing the second frame feature sequence through the time sequence relation network to obtain a second time sequence relation descriptor; and adjusting a model parameter of the action recognition model according to the first time sequence relation descriptor and the second time sequence relation descriptor, the adjusted action recognition model being configured to recognize an action in a video to be recognized.

2. The method according to claim 1, before the extracting a first training sample set, further comprising:

determining a use environment identifier of the action recognition model;

determining historical data matching the use environment identifier of the action recognition model according to the use environment identifier; and using different types of video samples screened from the historical data as the first training sample set.

3. The method according to claim 1, wherein the extracting a first training sample set comprises:

extracting N types of video information from the first training sample set, wherein Nis a positive integer;

extracting K video samples from each type of video information, wherein K is a positive integer;

combining the N types of all video samples to obtain the second training sample set, wherein all video samples in the N types comprise N*K video samples; and extracting at least one video sample from video information that is not extracted in the N types of video information, and using the extracted at least one video sample as the query video.

4. The method according to claim 1, wherein the processing the second training sample set comprises extracting each type of video frame set in the second training sample set and extracting a first frame level feature vector corresponding to the video frame set through the embedded layer network in the action recognition model;

determining a first channel quantity corresponding to the first frame level feature vector;

determining a first frame level feature vector set corresponding to the first frame level feature vector and a similarity matrix matching the first frame level feature vector set based on the first channel quantity;

fusing the first frame level feature vector set and the similarity matrix to obtain a second frame level feature vector set; and performing linear conversion on the second frame level feature vector set to obtain the first frame feature sequence.

5. The method according to claim 1, wherein the processing the query comprises:

extracting a third frame level feature vector from the query video through the embedded layer network;

determining a second channel quantity corresponding to the third frame level feature vector;

determining a third frame level feature vector set corresponding to the third frame level feature vector based on the second channel quantity; and performing linear conversion on the third frame level feature vector set to obtain the second frame feature sequence corresponding to the query video.

6. The method according to claim 4, wherein the extracting a first frame level feature vector comprises:

obtaining a down sampling result of the video frame set;

normalizing the down sampling result through a full connection layer of the embedded layer network; and performing deep analysis on normalization results of different image frames in the video frame set to obtain the first frame level feature vector.

7. The method according to claim 1, further comprising:

determining a first video frame quantity, a feature channel quantity, a first video frame height, and a first video frame width corresponding to the first frame feature sequence; and performing spatiotemporal motion enhancement on each video frame of the first plurality of frames in the first frame feature sequence according to the first video frame quantity, the feature channel quantity, the first video frame height, and the first video frame width corresponding to the first frame feature sequence, the spatiotemporal motion enhancement being used for enhancing a motion feature of each video frame in the first frame feature sequence.

8. The method according to claim 1, further comprising:

determining a second video frame quantity, a video channel quantity, a second video frame height, and a second video frame width corresponding to the second frame feature sequence; and performing spatiotemporal motion enhancement on each video frame of the second plurality of frames in the second frame feature sequence according to the second video frame quantity, the video channel quantity, the second video frame height, and the second video frame width corresponding to the second frame feature sequence, the spatiotemporal motion enhancement being used for enhancing a motion feature of each video frame in the second frame feature sequence.

9. The method according to claim 1, wherein the processing the first frame feature sequence comprises:

determining a first frame index parameter of the first frame feature sequence and different sub-sequences of the first frame feature sequence;

determining time sequence relation descriptors respectively corresponding to the different sub-sequences through the time sequence relation network in the action recognition model based on the first frame index parameter; and combining the time sequence relation descriptors respectively corresponding to the different sub-sequences to obtain the first time sequence relation descriptor.

10. The method according to claim 1, wherein the processing the second frame feature sequence comprises:

determining a second frame index parameter of the second frame feature sequence; and determining a second time sequence relation descriptor through the time sequence relation network based on the second frame index parameter.

11. The method according claim 1, wherein the adjusting a model parameter of the action recognition model comprises:

comparing the first time sequence relation descriptor with the second time sequence relation descriptor to obtain a similarity between the first time sequence relation descriptor and the second time sequence relation descriptor;

determining a weight parameter of different types of time sequence relation descriptors in the first time sequence relation descriptors according to the similarity between the first time sequence relation descriptor and the second time sequence relation descriptor;

determining a sample prototype of different types of video samples according to the weight parameter of the time sequence relation descriptor;

calculating a metric score of the query video and the sample prototype of each type of video samples; and determining a type of the video sample corresponding to a maximum metric score as a few-shot action type corresponding to the query video and based on the few-shot action type.

12. The method according to claim 1, further comprising:

determining a video frame sequence to be recognized in the video;

performing action recognition on the video frame sequence to be recognized through the adjusted action recognition model in order to obtain an action recognition result;

determining a copyright video corresponding to the video to be recognized;

determining an inter-frame similarity parameter set corresponding to the video to be recognized and the copyright video based on the action recognition result;

obtaining a video frame quantity meeting a similarity threshold in the inter-frame similarity parameter set; and determining a similarity between the video to be recognized and the copyright video based on the video frame quantity.

13. The method according to claim 12, further comprising:

in response to determining that the video to be recognized is similar to the copyright video based on the similarity between the video to be recognized and the copyright video, obtaining copyright information of the video to be recognized;

obtaining a comparison result between the copyright information of the video to be recognized and the copyright information of the copyright video, the comparison result being used for determining compliance of the video to be recognized; and in response to determining that the comparison result represents that the copyright information of the video to be recognized is inconsistent with the copyright information of the copyright video, generating warning information.

14. The method according to claim 12, further comprising:

in response to determining that the video to be recognized is not similar to the copyright video based on the similarity between the video to be recognized and the copyright video, determining the video to be recognized as a video to be recommended in a video source, wherein the video to be recommended carries a few-shot action recognition result;

sorting recall orders of all videos to be recommended in the video source; and correspondingly recommending a video to a target based on a sorting result.

15. A model-based data processing apparatus, comprising:

at least one memory configured to store program code; and at least one processor configured to read the program code and operate as instructed by the program code, the program code comprising:

sample obtaining code configured to cause the at least one processor to extract a first training sample set in order to obtain a second training sample set and extract, a query video, at least one video sample that is not included in the first raining sample set, the first training sample set comprising different types of video samples, the second training sample set obtained by combining the variety of types of video samples in the first training sample set;

feature extraction code, configured to cause the at least one processor to process the second training sample set through an embedded layer network in an action recognition model to obtain a first frame feature sequence, the first frame feature sequence comprising a first plurality of frames;

first processing code configured to cause the at least one processor to process the query video through the embedded layer network to obtain a second frame feature sequence, the second frame feature sequence comprising a second plurality of frames;

time sequence code, configured to cause the at least one processor to process the first frame feature sequence through a time sequence relation network in the action recognition model to obtain a first time sequence relation descriptor;

second processing code configured to cause the at least one processor process the second frame feature sequence through the time sequence relation network to obtain a second time sequence relation descriptor; and model training code configured to cause the at least one processor to adjust a model parameter of the action recognition model according to the first time sequence relation descriptor and the second time sequence relation descriptor, the adjusted action recognition model being configured to recognize an action in a video to be recognized.

16. The apparatus according to claim 15, wherein the sample obtaining code comprises:

first determining code configured to cause the at least one processor to determine a use environment identifier of the action recognition model;

second determining code configured to cause the at least one processor to determine historical data matching the use environment identifier of the action recognition model according to the use environment identifier; and sample training code configured to cause the at least one processor to use different types of video samples screened from the historical data as the first training sample set.

17. The apparatus according to claim 15, wherein the sample obtaining code further comprises:

first extracting code configured to cause the at least one processor to extract N types of video information from the first training sample set, wherein N is a positive integer;

second extracting code configured to cause the at least one processor to extract K video samples from each type of video information, wherein K is a positive integer;

combining code configured to cause the at least one processor to combine the N types of all video samples to obtain the second training sample set, wherein all video samples in the N types comprise N*K video samples; and third extracting code configured to cause the at least one processor to extract at least one video sample from video information that is not extracted in the N types of video information, and using the extracted at least one video sample as the query video.

18. The apparatus according to claim 15, wherein the feature extraction code comprises fourth extracting code configured to cause the at least one processor to extract each type of video frame set in the second training sample set and extracting a first frame level feature vector corresponding to the video frame set through the embedded layer network in the action recognition model;

third determining code configured to cause the at least one processor to determine a first channel quantity corresponding to the first frame level feature vector;

fourth determining code configured to cause the at least one processor to determine a first frame level feature vector set corresponding to the first frame level feature vector and a similarity matrix matching the first frame level feature vector set based on the first channel quantity;

fusing code configured to cause the at least one processor to fuse the first frame level feature vector set and the similarity matrix to obtain a second frame level feature vector set; and first linear conversion code configured to cause the at least one processor to perform linear conversion on the second frame level feature vector set to obtain the first frame feature sequence.

19. The apparatus according to claim 15, wherein the first processing code comprises:

fifth extracting code configured to cause the at least one processor to extract a third frame level feature vector from the query video through the embedded layer network;

fourth determining code configured to cause the at least one processor to determine a second channel quantity corresponding to the third frame level feature vector;

fifth determining code configured to cause the at least one processor to determine a third frame level feature vector set corresponding to the third frame level feature vector based on the second channel quantity; and second linear conversion code configured to cause the at least one processor to perform linear conversion on the third frame level feature vector set to obtain the second frame feature sequence corresponding to the query video.

20. A non-transitory computer-readable storage medium, storing a computer program that when executed by at least one processor causes the at least one processor to:

extract a first training sample set in order to obtain a second training sample set and extract, as a query video, at least one video sample that is not included in the first training sample set, the first training sample set comprising a variety of types of video samples, the second training sample set obtained by combining the variety of types of video samples in the first training sample set;

process the second training sample set through an embedded layer network in an action recognition model to obtain a first frame feature sequence, the first frame feature sequence comprising a first plurality of frames;

process the query video through the embedded layer network to obtain a second frame feature sequence, the second frame feature sequence comprising a second plurality of frames;

process the first frame feature sequence through a time sequence relation network in the action recognition model to obtain a first time sequence relation descriptor;

process the second frame feature sequence through the time sequence relation network to obtain a second time sequence relation descriptor; and adjust a model parameter of the action recognition model according to the first time sequence relation descriptor and the second time sequence relation descriptor, the adjusted action recognition model being configured to recognize an action in a video to be recognized.

* * * * *